Patented Oct. 31, 1939

2,178,010

UNITED STATES PATENT OFFICE 2,178,010

NUCLEAR SUBSTITUTED DERIVATIVES OF THE MORPHINE SERIES AND METHODS FOR THEIR PREPARATION

Lyndon Frederick Small, Charlottesville, Va., and Howard Montgomery Fitch, Woodstown, N. J., assignors to the Government of the United States of America as represented by the Secretary of the Treasury No Drawing. Application January 24, 1938, Serial No. 186,706. In Germany February 3, 1937

25 Claims. (Cl. 260—285)

(Granted under the act of March 3, 1883, as amended April 30, 1928; 370 O. G. 757)

The invention described herein may be manufactured and used by or for the Government of the United States for governmental purposes only without payment of any royalty thereon.

The present invention includes derivatives of the morphine series of a hitherto unknown type, in which an organic radical is directly joined to a carbon atom of the ring system present in the morphine series, as well as the hitherto unknown intermediate compounds from which these nuclear substituted morphine derivatives are prepared. It further includes the process in which an organomagnesium compound is caused to react with the enol ethers or enol esters of the dihydroketones derived from the opium alkaloids and alkaloid derivatives related to morphine.

The products of the invention show high physiological action of a medically useful type, and present marked advantages in their relative freedom from undesirable respiratory and emetic effects, and in their slight tendency to cause addiction. The products are designed to replace the commonly used narcotics of the morphine type in medical practice.

Thebaine is known to react with phenylmagnesium bromide or benzylmagnesium chloride to give products of uncertain structure, which are distinguished therein, that the methoxyl group present in thebaine as an enol ether group, is in the products of the reaction so changed in nature that it can no longer be hydrolyzed with the ease characteristic of enol ethers. In fact, the conditions which must be imposed to accomplish the hydrolysis are so drastic that other portions of the molecule are changed in the process; see M. Freund, Ber. deut. chem. Gesell. vol. 38, p. 3234 of 1905; Ger. Pat. 181,510 (1907); Freund and Speyer, Ber deut. chem. Gesell., vol. 49, p. 1287 of 1916; H. Hoek, Dissertation, Freiburg 1926; Small and Lutz, Chemistry of the Opium Alkaloids, supplement 103 to the Public Health Reports, U. S. Govt. Printing Office, 1932, pp. 332–336. It is also known from unpublished investigations of the applicants that methylmagnesium iodide reacts with thebaine to give methyldihydrothebaines of properties similar to those of Freund's phenyldihydrothebaine.

It has been demonstrated that compounds of the morphine series that have an unsaturated linkage in the 6,7- position of the nucleus react with organomagnesium halides to yield phenolic products that contain the organic radical of the Grignard reagent employed (see Small and Yuen, J. Am. Chem. Soc., vol. 58, p. 192 of 1936, also Lutz and Small, ibid., vol. 57, p 2651 of 1935), but this reaction has not hitherto been applied to the enol ethers and enol esters of the morphine series having one unsaturated alicyclic linkage, at position 6,7- only, of the nucleus.

It is now found that such enol ethers and enol esters of the morphine series react with organomagnesium compounds (commonly designated as Grignard's reagent), to give phenolic products containing the organic radical of the Grignard reagent employed, and that these new products, in contrast to the above mentioned, previously known products derived from thebaine, are hydrolyzed at the enol ether or enol ester group with extraordinary ease, whereby a ketone group is formed at position 6- of the nucleus. The reaction of organomagnesium compounds with enol ethers and enol esters of the morphine series having only the 6,7- alicyclic unsaturation therefore proceeds in a different way, and results in products of a different type of structure, than the above mentioned reaction of thebaine with phenyl-magnesium bromide or benzylmagnesium chloride.

The products of the reaction of organomagnesium compounds with enol ethers or enol esters of the morphine series are phenolic compounds containing the organic radical of the Grignard reagent employed, which are probably formed by addition of the Grignard reagent at the cyclic-ether-linked oxygen and at either carbon atom 5 or carbon atom 7 of the nucleus. The exact mechanism of the addition cannot at present be established, and is unessential to the novelty of the process or of the products obtained. It is not improbable that the addition takes place at both positions 5 and 7, or in two stereochemical ways, since two series of products are always obtained, designated arbitrarily as the normal and iso series. The reaction may be represented as follows, whereby, however, the inventors suggest only for the sake of explanation, the probable position of the entering organic radical converted to the corresponding 4,5-phenanthrylene oxide (4,5-epoxyphenanthrene) derivatives. The last named derivatives (organic radical sub-

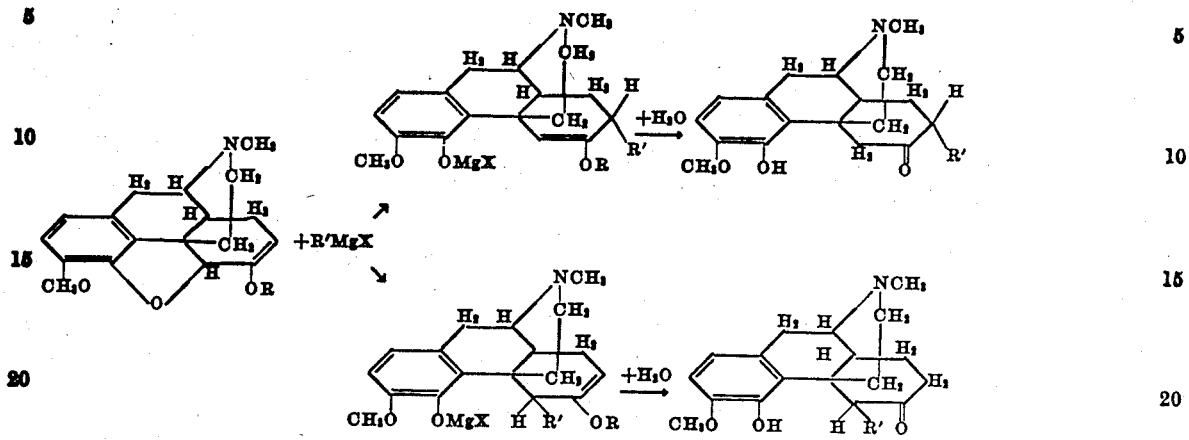

where

R=CH₃, C₂H₅, etc., or COCH₃, COC₂H₅, COC₆H₅, etc.

and

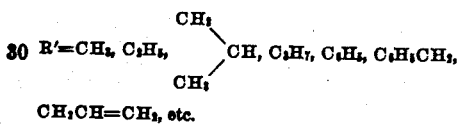

CH₂CH=CH₂, etc.

The Grignard reaction may be carried out in the customary solvents for such reactions, as diethyl ether, di-isopropyl ether, etc., whereby it is of advantage to extract the enol ether or enol ester continuously into the boiling ethereal solution of the Grignard reagent, making use of an extractor of the Soxhlet type. It is further found, that benzene as solvent, in contrast to its well known slowing effect on the addition of Grignard's reagent, greatly facilitates the reaction of this invention.

As is well known, it is exceedingly difficult to prepare solutions of organomagnesium halides, sulfates, etc., which are free from organic halides or sulfates. If such solutions containing free halide or sulfate are brought into reaction with compounds containing basic nitrogen (i. e., the alkaloids or their derivatives), a portion of the product may appear as the quaternary salt, and can be recovered only with extreme difficulty, if at all. This side reaction is especially evident in the presence of any free alkyl halide. It is now found that undesirable addition which results in the loss of material in the form of quaternary salts can be prevented, and the yield of the desired reaction product improved, if the solution of the organomagnesium compound is treated, before the reaction is begun, with sufficient tertiary amine to combine with all of the alkyl halide present, and that an excess of tertiary amine is not deleterious. For this purpose, a volatile tertiary amine, as trimethylamine, is most suitable, but other members of the class may be employed.

The products of the reaction that we have now disclosed are organic radical substituted derivatives of dihydrothebainone, and by bromination, followed by treatment with alkali and debromination (method of C. Schöpf, Liebig's Annalen d. Chem., vol. 483, p. 157 of 1930, ibid., vol. 483, p. 169 of 1930, German Patent 533,692 of August 11, 1929, to C. H. Boehringer Sohn A.-G.) can be stituted dihydrocodeinones) may be by well known methods (1) reduced at the ketone group, yielding organic radical substituted dihydrocodeine or dihydroisocodeine derivatives;

(2) hydrolyzed at the etherfied hydroxyl occupying nuclear position 3-, yielding organic radical substituted derivatives of dihydromorphinone;

(3) by a combination of (1) and (2) or (2) and (1), transformed into organic radical substituted derivatives of dihydromorphine or dihydro-α-isomorphine.

If the nuclear substituted derivatives of dihydrocodeinone resulting from the above described series of reactions be subjected to the action of reagents suitable for the formation of enol esters (as for example acetic anhydride and sodium acetate), enol esters are obtained which may be subjected again to the action of Grignard's reagent, whereby a second organic radical (which may be the same as, or different from, the previously substituted radical) is introduced.

*Example 1.*—Forty grams of dihydrothebaine (the methyl enol ether of dihydrocodeinone), in a Soxhlet extractor, is extracted during 36 hours into boiling ethereal methylmagnesium iodide solution, and the mixture is held in ebullition for about 72 hours, with constant mechanical stirring. The reaction time may be shortened considerably by using methylmagnesium iodide in benzene solution, or in isopropyl ether, or other solvent commonly employed in the Grignard reaction. Decomposition of the reaction mixture in the usual way results in 19 to 25 g. of methyldihydrothebainone, which crystallizes well from alcohol or acetone, has the formula $C_{19}H_{25}O_3N$, M. P. 192–193° C., and $$(\alpha)_D^{24} - 20.5° \text{ (alcohol, } c=1.026)$$

Its hydrochloride crystallizes from alcohol or water, melts with decomp. at 283–285° C. (evac. tube) and has $$(\alpha)_D^{24} - 6.8° \text{ (water, } c=1.025)$$

From the same reaction is obtained in smaller quantity iso-methyldihydrothebainone of formula $C_{19}H_{25}O_3N$, M. P. 168–168.5° C., and having $$(\alpha)_D^{24} - 57.0° \text{ (alcohol, } c=1.023)$$

*Example 2.*—Twelve hundred cubic centimeters of ethereal molar solution of methylmagnesium iodide is distilled to dryness, and 200 g. of dihydrothebaine dissolved in 4000 cc. of anhydrous benzene is added to the oily Grignard reagent. The homogeneous solution is heated under reflux during 12 hours. At the end of this time a heavy white precipitate has formed. The reaction mixture is treated with 3000 cc. of 3-normal hydrochloric acid, the benzene layer being separated off and discarded. The hydrochloric acid solution, in small portions, is layered over with 25 times its volume of ether, treated with excess of ammonium hydroxide, and the ether extract is freed from ether by distillation. The semi-crystalline product obtained, about 130 g., is purified in the manner described under Example 1.

Example 3.—The reaction of dihydrothebaine with methylmagnesium iodide is carried out as described in Examples 1 and 2, except that 8 g. of anhydrous trimethylamine is distilled into the ether, benzene, isopropyl ether, etc., solution of methylmagnesium iodide before the reaction between the Grignard reagent and dihydrothebaine, as disclosed in Examples 1 and 2, is initiated. This results in an improvement in the yield of the products of the reaction.

Example 4.—The reaction is carried out as in Examples 1, 2 and 3, except that ethylmagnesium iodide, isopropylmagnesium bromide, n-amylmagnesium bromide, benzylmagnesium chloride, or phenylmagnesium bromide are used in place of the methylmagnesium iodide. The products obtained are respectively ethyldihydrothebainone, $C_{20}H_{27}O_3N$, M. P. 190.5–191.5° C., $(\alpha)_D^{25} +10.9°$ (alcohol, c=1.009)

iso-ethyldihydrothebainone, $C_{20}H_{27}O_3N$, M. P. 188–189° C., $(\alpha)_D^{22} -36.2°$ (alcohol, c=0.994)

isopropyldihydrothebainone, $C_{21}H_{29}O_3N$, M. P. 217.5–219.5° C., $(\alpha)_D^{21} -34.0°$ (benzene, c=0.940)

n-amyldihydrothebainone, $C_{23}H_{33}O_3N$, M. P. 153–155° C., benzyldihydrothebainone, $C_{25}H_{29}O_3N$, of M. P. 227–229° C., phenyldihydrothebainone, $C_{24}H_{27}O_3N$, M. P. 213–214° C., M. P. 224–225° C.

Example 5.—The reaction is carried out as specified in Examples 1, 2, or 3, except that in place of dihydrothebainone, the enol esters of the various known dihydroketones of the morphine series are employed. Using dihydrocodeinone enol acetate, the products are identical with those obtained from dihydrothebaine. Using acetyldihydrohydroxycodeinone enol acetate, organic radical substituted derivatives of dihydrohydroxythebainone are obtained, for example methyldihydrohydroxythebainone, $C_{19}H_{25}O_4N$, amorphous, whose oxime hydrochloride melts at 205–208° C. Using methyldihydrocodeinone enol acetate, organic radical substituted derivatives of methyldihydrothebainone are obtained.

Example 6.—The various products of the reactions specified above are subjected to the well known 4,5-ether ring closure process of C. Schöpf, and the products thus obtained are dealkylated at the phenolic ether group, or are reduced at the ketonic oxygen, by well known methods, or these two processes are combined. As a specific example of the application of these several processes to the further transformation of the nuclear organic radical substituted dihydrothebainones resulting from the reactions of Examples 1 to 5 inclu., the transformation of the nuclear methylated dihydrothebainone is described:

A solution of 20 g. of methyldihydrothebainone in 200 cc. of glacial acetic acid, mechanically stirred, is treated dropwise with 193 cc. (2 moles) of a solution of bromine in glacial acetic acid having a concentration of 32 g. of bromine per 200 cc. of solution. A decided improvement in the yield and quality of the bromination product results if the bromination as described by Schöpf (Ger. Pat. 533,692 of Aug. 11, 1929) is modified in that the rate of addition of bromine is carefully controlled, not more than 8 cc. of bromine solution being added per hour. The solution resulting after addition of the specified amount of bromine is concentrated under diminished pressure to a viscous consistency, the product is dissolved in a suitable amount of water, and is treated with excess of 10 normal sodium hydroxide. The thereby precipitated bromomethyldihydrocodeinone is purified from ether and ethyl acetate, yield about 22 g. or 88% of the calculated amount. It has the formula $C_{19}H_{22}O_3NBr$, the M. P. 143.5–145° C., and $(\alpha)_D^{24} -109.4°$ in alcohol (c=1.024)

A solution of 18.2 g. of crude bromomethyldihydrocodeinone in 200 cc. of 2 N acetic acid with 5 g. of potassium acetate, a little gum arabic, and 10 cc. of 1% palladous chloride solution is shaken in the presence of hydrogen until reaction ceases. The product, isolated in the usual way, is about 12 g. of methyldihydrocodeinone.

Dealkylation at the phenolic ether group is accomplished in that 23 g. of methyldihydrocodeinone is boiled for 25 minutes in 40 cc. of 48% aqueous hydrobromic acid. The yield is about 19 g. of methyldihydromorphinone.

Reduction at the ketonic oxygen group is accomplished in that 1.4 g. of methyldihydromorphinone or methyldihydrocodeinone in alcoholic solution is reduced with hydrogen and platinum. The yield is 1.2 g. of methyldihydromorphine or methyldihydrocodeine respectively.

The most important products obtained by the application of these above disclosed processes to the various organic radical substituted dihydrothebainones are described and defined as follows:

Methyldihydrocodeinone, $C_{19}H_{23}O_3N$, M. P. 144–144.5° C.; $(\alpha)_D^{23} -146.9°$ (alcohol, c=0.994).

Methyldihydrocodeinone enol acetate, $C_{21}H_{25}O_4N$, M. P. 191–194.5° C; $(\alpha)_D^{23} -142.9°$ (alcohol, c=0.980).

Methyldihydrocodeine, $C_{19}H_{25}O_3N + H_2O$, M. P. 98–102° C.; $(\alpha)_D^{24} -84.8°$ (alcohol, c=0.990).

Methyldihydromorphinone, $C_{18}H_{21}O_3N$, M. P. 243–245° C.; (evac. tube); $(\alpha)_D^{24} -140.7°$ (alcohol, c=1.009).

Methyldihydromorphine, $C_{18}H_{23}O_3N$, M. P. 206–207° C.; $(\alpha)_D^{24} -92.9°$ (alcohol, c=1.017).

Iso-methyldihydrocodeinone, $C_{19}H_{23}O_3N$, M. P. 144–145° C.; $(\alpha)_D^{24} -179.4°$ (alcohol, c=0.995).

Iso-methyldihydrocodeinone enol acetate, $C_{21}H_{25}O_4N$, M. P. 123–124° C.; $(\alpha)_D^{24} -250.3°$ (alcohol, c=1.00).

Iso-methyldihydrocodeine, $C_{19}H_{25}O_3N$, M. P. 103–104° C.; $(\alpha)_D^{21} -126.9°$ (alcohol, c=0.646).

Ethyldihydrocodeinone, $C_{20}H_{25}O_3N$, M. P. 163–164° C.; $(\alpha)_D^{25} -100.9°$ (alcohol, c=0.996).

Ethyldihydrocodeinone enol acetate, $C_{22}H_{27}O_4N$, M. P. 129–130° C.; $(\alpha)_D^{25} -124.1°$ (alcohol, c=1.007).

Ethyldihydrocodeine, $C_{20}H_{27}O_3N$, liquid, $(\alpha)_D^{22} -84.8°$ (alcohol, c=0.690); perchlorate, $C_{20}H_{28}O_7NCl$, M. P. 275–276° C. (evac. tube); $(\alpha)_D^{22} -60.5°$ (ethanol, c=0.314).

5   Ethyldihydromorphinone, $C_{19}H_{23}O_3N$, M. P. 213–214° C.; $(\alpha)_D^{25} -103.5°$ (ethanol, c=0.976).

Isopropyldihydrocodeinone, $C_{21}H_{27}O_3N$, M. P. 175–177° C.

10   Isopropyldihydromorphinone, $C_{20}H_{25}O_3N$, M. P. 236–238° C. whose hydrochloride shows $(\alpha)_D^{25} -64.2°$ (water, c=0.873).

n-Amyldihydrocodeinone, $C_{22}H_{31}O_3N$, M. P. 153–155° C.

15   n-Amyldihydromorphinone, $C_{22}H_{29}O_3N$, M. P. 113–116° C., whose hydrobromide melts at 194–196° C. (evac. tube).

*Example 7.*—To the residue resulting from distilling the diethyl ether away from 160 cc. of molar ethereal methylmagnesium iodide is added a solution of 13.3 g. of methyldihydrocodeinone enol acetate in 200 cc. of anhydrous benzene. A vigorous reaction ensues, which is completed by heating the solution for a short time under reflux. Isolation of the product is accomplished in the usual way for Grignard reactions and results in about 9.4 g. of crude dimethyldihydrothebainone, whose formula is $C_{20}H_{27}O_3N$, M. P. 199–201° C., and has $(\alpha)_D^{25} +3.50°$ in alcohol (c=0.858)

As shown above, the present invention includes the nuclear organic radical substituted derivatives of dihydrothebainone, and of dihydrocodeinone, dihydromorphinone, dihydrocodeine and dihydromorphine, having the same structure as corresponding compounds obtainable by the methods of which examples are set forth. The products are intended to be administered in any of the usual ways, e. g., by mouth, or by injection, and thus, obviously, where the new parent compounds are named herein as representative for purposes of definition, the recitations thereof are intended to be interpreted as including the inventive products whether embodied per se or in the form of organic or inorganic salts or esters thereof.

In the appended claims, where the term "which is identical with" is employed, this term is to be interpreted as applying to the included products per se, whether produced by the process recited or by an alternative process.

As used in this description, the term "morphine series" comprehends the alkaloid derivatives related to morphine, codeine and thebaine and obtainable from them or from their derivatives.

What we claim as new is:

1. A process of preparing nuclear organic radical substituted derivatives of substances of the group consisting of dihydrothebainone and dihydrohydroxythebainone wherein a substance from the group consisting of the enol ethers and esters of dihydrocodeinone and dihydrohydroxycodeinone is caused to react with the organomagnesium compounds commonly known as Grignard's reagents, and the resulting product is hydrolized.

2. A process for preparing nuclear organic radical substituted derivatives of substances of the group consisting of dihydro-thebainone and dihydrohydroxycodeinone, wherein a substance from the group consisting of the enol ethers and enol esters of dihydrocodeinone and dihydrohydroxycodeinone is caused to react in benzene solution with organomagnesium compounds commonly known as Grignard's reagents, and the resulting product is hydrolized.

3. A process for improving the yields from the reaction of claim 1 consisting in inactivating any side reactant in the Grignard reagent which otherwise might add to the basic nitrogen atom of the compound to be acted upon, without inactivating the organomagnesium compound of the reagent, by pre-treating the Grignard reagent with a quantity of an aliphatic tertiary amine sufficient to combine with at least substantially all said side reactant.

4. A process for improving the yields from the reaction of claim 1, consisting in inactivating any constituent of the Grignard reagent from the group consisting of organic halides and sulphates, which might otherwise add to the basic nitrogen atom of the compound to be acted upon, without inactivating the organomagnesium compound of the reagent, by pretreating the Grignard reagent with a quantity of trimethylamine sufficient to combine with at least substantially all said organic halides and sulfates.

5. The process of improving Grignard reagents containing deleterious side-reactants of the class forming quaternary compounds when the reagents are brought into reaction with compounds containing basic nitrogen, said process consisting in inactivating said side reactants without inactivating the organomagnesium compounds of the Grignard reagents by pre-treating the reagents with a quantity of aliphatic tertiary amine sufficient to combine with at least substantially all said side reactants.

6. In the field of Grignard reagents normally comprising organomagnesium compounds and side reactants from the class consisting of organic halides and sulfates, the improved reagent consisting of the combination therewith of an aliphatic tertiary amine inactivating said side-reactants while the organomagnesium compounds of the reagent remain active.

7. In the field of Grignard reagents normally comprising organomagnesium compounds and side-reactants from the class consisting of organic halides and sulfates, the improved reagent consisting of the combination therewith of a volatile aliphatic tertiary amine inactivating said side reactants while the organomagnesium compounds of the reagent remain active.

8. A process for improving the yields in reactions between organic substances containing a tri-valent basic nitrogen atom and Grignard reagents normally comprising organomagnesium compounds and side-reactants of the class forming quaternary compounds with such basic nitrogen atom, consisting in preceding the said reaction by inactivating said side reactants without inactivating the organomagnesium compounds by adding an aliphatic tertiary amine to the Grignard reagent in a quantity sufficient to combine with at least substantially all said side reactants.

9. A process for preparing a dihydrothebainone disubstituted by radicals of the group consisting of aryl, alkyl and aralkyl, comprising converting by known methods, a compound selected from the group consisting of the mono-aryl, -alkyl or -aralkyl dihydrothebainones identical with the corresponding mono-substituted compounds obtainable by reacting a substance from the group consisting of the enol ethers and esters of dihydrocodeinone and dihydrohydroxycodeinone with the organomagnesium compounds commonly known as Grignard's reagents and hydrolyzing the resulting product, into the correspondingly substituted dihydrocodeinone enol compound of the group consisting of esters and ethers, reacting said enol compound with a Grignard reagent the organic radical of which is selected from the group consisting of alkyl, aryl and aralkyl, and hydrolyzing the resulting product.

10. A ketonic derivative which is identical with the derivative obtained by hydrolyzing the reaction product of a Grignard reagent with a compound from the group consisting of the enol ethers and enol esters of dihydrocodeinone and dihydrohydroxycodeinone.

11. A ketonic derivative which is identical with the derivative obtained by hydrolyzing the reaction product of a Grignard reagent with a compound from the group consisting of the enol ethers and enol esters of the substituted dihydrocodeinones which are obtainable by converting, by known methods, the substituted dihydrothebainones of claim 10 to the correspondingly substituted dihydrocodeinones.

12. A substituted dihydrocodeinone which is identical with that obtainable by converting, by known methods, a substituted dihydrothebainone obtained by the process of claim 1, to the correspondingly substituted dihydrocodeinone.

13. A disubstituted dihydrocodeinone which is identical with that obtainable by converting, by known methods, a disubstituted dihydrothebainone obtained by the process of claim 9, to the correspondingly disubstituted dihydrocodeinone.

14. A substituted dihydromorphinone which is identical with that obtainable by converting by known methods, a substituted dihydrothebainone obtained by the process of claim 1, to the correspondingly substituted dihydromorphinone.

15. A disubstituted dihydromorphinone which is identical with that obtainable by converting, by known methods, a disubstituted dihydrothebainone obtained by process of claim 9, to the correspondingly disubstituted dihydromorphinone.

16. A derivative of dihydrothebainone having directly attached to the nucleus a radical from the group consisting of alkyl, aralkyl and aryl, said derivative being identical with the derivative obtainable through the process of claim 1.

17. A derivative of dihydrothebainone having directly attached to the nucleus two radicals from the group consisting of alkyl, aralkyl and aryl, said derivative being identical with the derivative obtainable through the process of claim 9.

18. A substituted dihydromorphine which is identical with that obtainable by converting, by known methods, a substituted dihydrothebainone obtained by the process of claim 1, to the correspondingly substituted dihydromorphine.

19. A disubstituted dihydromorphine which is identical with that obtainable by converting, by known methods, a disubstituted dihydrothebainone obtained by the process of claim 9, to the correspondingly disubstituted dihydromorphine.

20. A substituted dihydrocodeine which is identical with that obtainable by converting, by known methods, a substituted dihydrothebainone obtained by the process of claim 1, to the correspondingly substituted dihydrocodeine.

21. A disubstituted dihydrocodeine which is identical with that obtainable by converting, by known methods, a disubstituted dihydrothebainone obtained by the process of claim 9, to the correspondingly disubstituted dihydrocodeine.

22. A compound of the group consisting of methyldihydrothebainone, $C_{19}H_{25}O_3N$; iso-methyldihydrothebainone, $C_{19}H_{25}O_3N$; methyldihydrocodeinone, $C_{19}H_{23}O_3N$; iso-methyldihydrocodeinone, $C_{19}H_{23}O_3N$; methyldihydrocodeinone enol acetate, $C_{21}H_{25}O_4N$; iso-methyldihydrocodeinone enol acetate, $C_{21}H_{25}O_4N$; methyldihydromorphinone, $C_{18}H_{21}O_3N$; methyldihydromorphine, $C_{18}H_{23}O_3N$; iso-propyl-dihydromorphinone, $C_{20}H_{25}O_3N$; n-amyldihydrothebainone, $C_{23}H_{33}O_3N$; n-amyldihydrocodeinone, $C_{23}H_{31}O_3N$; n-amyldihydromorphinone, $C_{22}H_{29}O_3N$; benzyldihydrothebainone, $C_{25}H_{29}O_3N$; phenyldihydrothebainone, $C_{24}H_{27}O_3N$; said compound being identical with the corresponding compound obtainable by reacting a substance selected from the group consisting of the enol ethers and enol esters of dihydrocodeinone with a Grignard reagent the organic radical of which corresponds to the substituent named, hydrolyzing the resulting product to produce a dihydrothebainone substituted by the organic radical of the Grignard reagent, and, where necessary, converting the resulting substituted dihydrothebainone by known methods to the correspondingly substituted named morphine derivative.

23. A substance of the group consisting of methyldihydromorphinone ($C_{18}H_{21}O_3N$) of melting point 243°–245° centigrade, and specific rotation −140.7° in alcohol, and the salts thereof.

24. In a process for preparing nuclear organic radical substituted derivatives of the class described, the step consisting in causing a substance from the group consisting of enol ethers and enol esters of dihydocodeinone and dihydrohydroxycodeinone, of the probable formula including one unsaturated alicyclic linkage at the position 6, 7- only of the nucleus, to react with a Grignard reagent to produce a phenolic product which contains the organic radical of the Grignard reagent employed and is capable of hydrolysis at the enol ether or enol ester group to form a ketone.

25. The improvement consisting in carrying out the step of claim 24 in benzene as a solvent.

LYNDON FREDERICK SMALL.
HOWARD MONTGOMERY FITCH.